United States Patent [19]

Adams

[11] Patent Number: 4,785,306

[45] Date of Patent: Nov. 15, 1988

[54] DUAL FREQUENCY FEED SATELLITE ANTENNA HORN

[75] Inventor: Edwin A. Adams, Simcoe, Canada

[73] Assignee: General Instrument Corporation, New York, N.Y.

[21] Appl. No.: 819,679

[22] Filed: Jan. 17, 1986

[51] Int. Cl.⁴ .............................................. H01Q 13/00
[52] U.S. Cl. ..................................... 343/786; 343/785
[58] Field of Search ................................. 343/785, 786

[56] References Cited

U.S. PATENT DOCUMENTS

| | | | |
|---|---|---|---|
| 3,389,394 | 6/1968 | Lewis | 343/725 |
| 3,438,041 | 4/1969 | Holtum | 343/779 |
| 3,500,419 | 3/1970 | Leitner et al. | 343/725 |
| 3,523,297 | 8/1970 | Fee | 343/771 |
| 4,083,050 | 4/1978 | Hall | 343/729 |
| 4,274,097 | 6/1981 | Krall et al. | 343/719 |
| 4,282,527 | 8/1981 | Winderman et al. | 343/725 |
| 4,287,519 | 9/1981 | Doi | 343/725 |
| 4,297,707 | 10/1981 | Brunner et al. | 343/725 |
| 4,482,899 | 11/1984 | Dragone | 343/786 |
| 4,630,059 | 12/1986 | Mörz | 343/786 |

Primary Examiner—William L. Sikes
Assistant Examiner—Robert E. Wise
Attorney, Agent, or Firm—Hopgood, Calimafde, Kalil, Blaustein & Judlowe

[57] ABSTRACT

A feed horn arrangement for reception of C-band and Ku-band signals by a single satellite antenna. The arrangement permits a Ku-band feed horn and amplifier to be mounted at the focus of a satellite dish in addition to the C-band reception equipment. A dielectric rod is mounted within the preexisting C-band waveguide to act as a waveguide to direct Ku-band signals to the Ku-band feed horn and amplifier. The Ku-band dielectric waveguide has no effect on the C-band signals which are amplified by the standard C-band amplifier. The dielectric waveguide may be either straight or curved according to the configuration of the C-band reception equipment.

12 Claims, 2 Drawing Sheets

DUAL FREQUENCY FEED SATELLITE ANTENNA HORN

BACKGROUND AND SUMMARY OF THE INVENTION

This invention relates to satellite antenna horns and particularly to a satellite antenna feed horn arrangement for receiving both C-band and Ku-band signals.

The use of satellite receiving dishes has now become commonplace for consumers as well as commercial customers. The vast majority of these dishes include a feed horn and a low noise amplifier (LNA) for receiving broadcasts transmitted on the so-called "C-band" at frequencies of approximately 4 GHz. More recently however a second generation of geosynchronous satellites have begun transmitting on the "Ku-band" at 12 GHz. Reception of Ku-band signals by C-band antennas and amplifying systems is generally not practicable as low noise block converting amplifiers (LNB's) capable of amplifying both Ku- and C-band signals have generally been prohibitively expensive. Furthermore, a satellite dish owner is unlikely to want to discard a working C-band LNA in order to replace it with a dual band LNB. However, LNB's specifically designed for Ku-band operation are relatively inexpensive.

Since there is quite a large base of installed C-band antennae it is desirable to provide a means to permit relatively inexpensive reception of Ku-band signals with a preexisting C-band antenna. The present invention provides a feed horn arrangement to permit separate C-band and Ku-band LNB's to be mounted on a single dish without cross interference.

It has been found that a relatively narrow diameter dielectric rod will form a waveguide for Ku-band signals. Furthermore, such dielectric rods are substantially transparent to C-band signals. Accordingly, the feed horn arrangement of the present invention includes a dielectric rod mounted within the pre-existing C-band waveguide to direct Ku-band signals to a separate Ku-band feed horn and LNB. The Ku-band waveguide has no effect on the C-band signals which are amplified by the standard C-band LNA. The dielectric rod waveguide may be either straight or curved depending on the configuration of the C-band amplifiers and polarizers.

Accordingly, it is an object of this invention to provide a feed horn arrangement capable of permitting C-band and Ku-band reception with a single satellite antenna.

It is another object of this invention to provide retrofitting of Ku-band reception apparatus to C-band satellite antenna reception apparatus.

It is another object of this invention to provide both C-band and Ku-band reception capabilities to a satellite antenna without the need for a dual frequency LNB.

Still other objects of this invention will become apparent upon a reading of the detailed specification to follow.

BRIEF DESCRIPTION OF THE DRAWINGS

For better understanding of the invention reference is made to the following drawings to be taken in conjunction with the detailed specification to follow.

DESCRIPTION OF THE PREFERRED EMBODIMENTS

Figure 1:
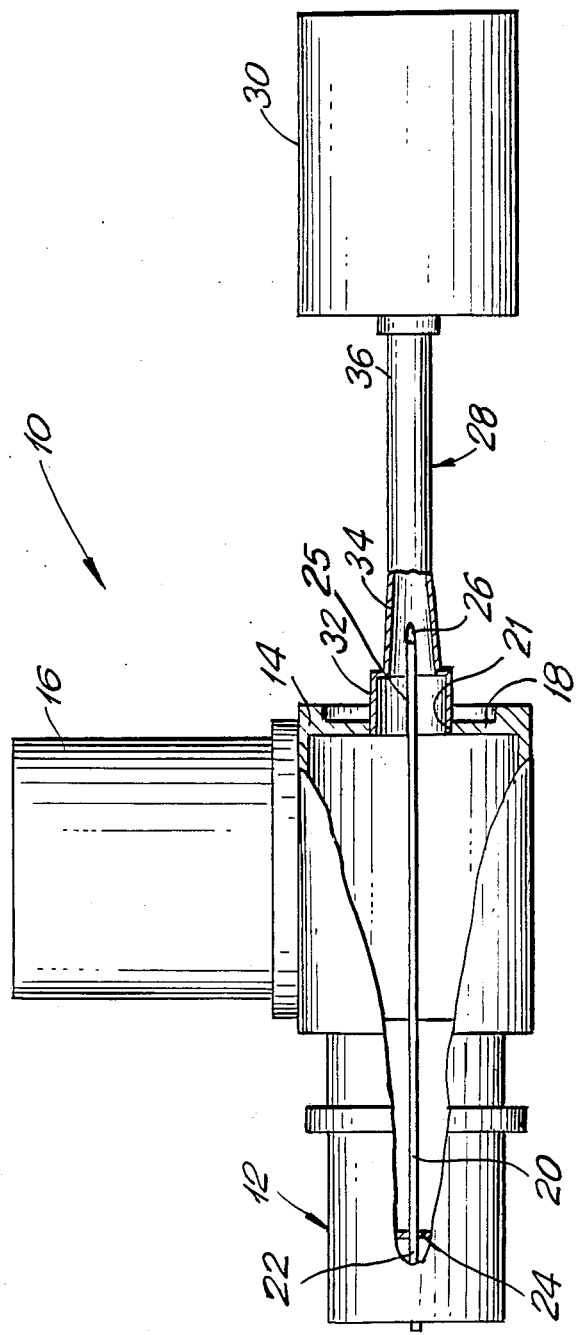
FIG. 1 is a partial sectional drawing of a first embodiment of a satellite antenna feed horn arrangement constructed in accordance with the present invention.

FIG. 1 illustrates a first embodiment of a feed horn arrangement 10 for providing both C- and Ku-band reception to a single satellite antenna or dish. This embodiment includes an "Andrews" single plane polarizing C-band coaxial waveguide or feed horn 12, whose rear portion 14 mounts a C-band LNA 16. The entire assembly is mounted at the focus of a satellite dish (not shown). It has been found that a Ku-band (12 GHz) wave guide is formed by a relatively small diameter rod of dielectric material. One suitable dielectric material is tetraflouroethylene plastic (Teflon) although other dielectric materials may also be used. The appropriate diameter for such a rod is a function of the dielectric constant e of the material. The dielectric rod diameter is equal to the diameter of a hollow tubular waveguide for the Ku-band (0.625 inches) divided by the dielectric constant (2.1) of teflon:

$$d_{rod} = 0.625/e = 0.625/2.1 = 0.30''$$

where $e_{teflon} = 2.1$

Accordingly, the appropriate diameter for a Ku band Teflon waveguide is approximately 0.30 inches which may be approximated by a 5/16 inch (0.3125) diameter rod. A rod of this diameter is considerably smaller than the inner diameter of a C-band feed horn and thus will easily fit within it. Because the rear portion 14 of waveguide 12 mounts LNA 16 at a right angle to its longitudinal axis there is no reception equipment located at its rear wall 18. Accordingly, Ku-band reception apparatus may be readily located at rear wall 18.

In accordance with the invention, a 5/16" diameter teflon rod 20 is mounted within C-band coaxial waveguide 12 and extends through and out of rear portion 14 through an aperture 21 disposed in rear wall 18. The forward portion 22 of rod 20 is mounted and centered within waveguide 12 by means of dielectric annular mounting disks 24 which engage the inner surface of waveguide 12. The rearward portion 25 of rod 20, extending out of polarizer 14, terminates in a tapered tip 26.

Also mounted to aperture 21 in rear wall 18 is a metallic Ku-band feed horn 28 feeding a 12 GHz LNB 30. Feed horn 28 includes a cylindrical forward portion 32 for mounting within aperture 21, a conical portion 34 and a cylindrical rear portion 36 joined to LNB 30. Conical portion 34 of feed horn 28 tapers from a diameter of approximately 1.025 inches to the 0.625 inch diameter of the rear portion 36 of Ku-band feed horn 28. The length of rod 20 is such that tapered tip 26 is located at conical portion 34 of feed horn 28 to insure that the Ku-band wave is properly launched into feed horn 28. Rod 20 should be centered within Ku-band feed horn 12 to provide maximum signal strength. No substantial signal deterioration will occur if annular mounting disks 24 are constructed of teflon and have a thickness on the order of 1/16 inch.

In use, both Ku-band and C-band signals are reflected from the satellite dish and enter feed horn 12. The C-band signals will travel through C-band feed horn 12 and will be directed by rear portion 14 into C-band LNA 16. The Ku-band signals will follow dielectric rod 20 back through rear wall 18 and be launched into Ku-band feed horn 28 for amplification by Ku-band LNB 30. Because rod 20 is substantially transparent to C-band signals its presence within waveguide 12 has essentially no effect on C-band signals. Thus, feed horn arrangement 10 enables reception of both C- and Ku-band signals by a single antenna with the different frequency signals being directed to the appropriate amplifier.

Figure 2:
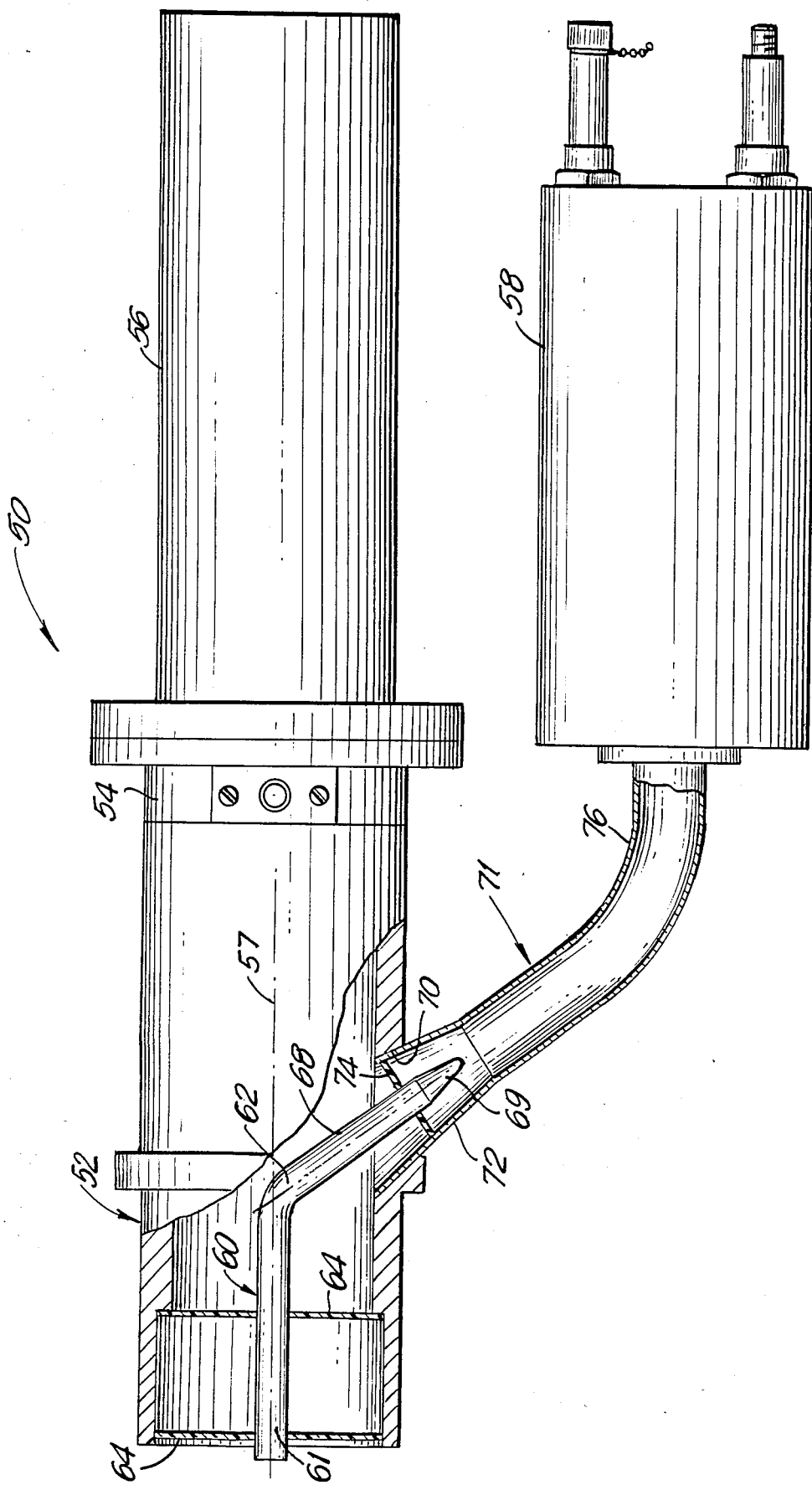
FIG. 2 is a partial sectional view of a satellite antenna feed horn arrangement constructed in accordance with a second embodiment of the invention.

Feed horn arrangement 10 as illustrated in FIG. 1 is particularly suitable for a use with C-band equipment having a single plane polarizing feed horn as the LNA is disposed at right angles. However, this approach is not practicable in C-band systems utilizing switchable dual-plane polarizers which mount C-band LNA along the longitudinal axis of the C-band feed horn. In such systems the feed horn arrangement 50 illustrated in FIG. 2 is used.

Feed horn arrangement 50 includes a standard C-band waveguide or feed horn 52, a switchable dual plane polarizer 54 at the rearward end of feed horn 52 and a C-band LNA or LNB 56 mounted to the rear of polarizer 54. Since LNA 56 is located at the rear of polarizer 54, any Ku-band signal must be directed away from the longitudinal axis 57 of feed horn 52. This is accomplished by a curved dielectric rod 60 which directs the Ku-band signals outside of C-band feed horn 52. Rod 60 is a teflon rod of 5/16" diameter as discussed above.

The forward end 61 of rod 60 is mounted within feed horn 52 by a pair of annular dielectric mounting disks 64 which engage the inner surface of feed horn 52. The central portion 62 of rod 60 is curved away from the longitudinal axis 57 of feed horn 52 at an angle of approximately 55°. The rear portion 68 of rod 60 exits and extends out of feed horn 52 through an aperture 70 disposed in the side of feed horn 52. Rear portion 68 of rod 60 terminates in a tapered tip 69 to insure optimal launching of the Ku-band signal. Also disposed in aperture 70 in the side of waveguide 52 is a metallic Ku-band feed horn 71 which includes a conical forward portion 72 similar to portion 34 of waveguide 26 as described above. An annular dielectric mounting disk 74 serves to center rear portion 68 of rod 60 within feed horn 71. Tapered tip 69 of rod 60 is positioned within conical portion 72 of feed horn 71 to optimize the transition of the Ku-band signal from rod 60 to feed horn 71.

Feed horn 71 has a diameter of 0.625 inches and includes a curved rearward portion 76 which permits Ku-band LNB 58 to be positioned parallel to C-band LNA 56 so as to minimize shadowing of the satellite disk. The 55° angle of curvature between rear portion 68 of rod 60 and the longitudinal axis 57 of feed horn 52 causes no significant Ku-band signal loss. In order to minimize signal deterioration in the C-band, the plane of curvature of rod 60 is optimally disposed at a 45° angle to the polarization planes of polarizer 54. Thus, feed horn arrangement 50 of FIG. 2 minimizes signal deterioration of both the C- and Ku-band signals by the waveguide of the other frequency. Accordingly, both the C-band and Ku-band signals are routed to their respected amplifiers without interference to optimize reception of both satellite bands.

Although the present invention has been described in conjunction with preferred embodiments, it is to be understood that modifications and variations may be resorted to without departing from the spirit and scope of the invention, as those skilled in the art will readily understand. Such modifications and variations are considered to be within th purview and scope of the invention and the appended claims.

What is claimed is:

1. An antenna feed horn arrangement for feeding first and second amplifiers for amplifying first and second frequency signals, said second frequency signals having a higher frequency than said first frequency signals, said arrangement comprising:
   a first frequency feed horn for feeding said first frequency signals to said first amplifier;
   a second frequency feed horn for feeding said second frequency signals to said second frequency amplifier; and
   curved solid dielectric waveguide means for said second frequency signals, said curved solid dielectric waveguide means having a first portion disposed within said first frequency feed horn and a second portion extending out of a sidewall of said first frequency feed horn and into said second frequency feed horn to thereby launch said second frequency signal within said second frequency feed horn.

2. The feed horn arrangement as claimed in claim 1 further including dual plane polarizing means disposed at the rearward end of said first frequency feed horn, said curved solid dielectric waveguide means having a plane of curvature disposed at 45° to the polarization planes of said polarizing means.

3. The feed horn arrangement as claimed in claim 1 wherein said second frequency feed horn comprises a metallic tubular feed horn.

4. The feed horn arrangement as claimed in claim 3 wherein the forward portion of said second frequency feed horn is conical.

5. The feed horn arrangement as claimed in claim 4 wherein the rearward portion of said dielectric waveguide means includes a tapered tip positioned within said conical forward portion of said feed horn.

6. The feed horn arrangement as claimed in claim 1 wherein said first frequency lies within the C-band frequency spectrum.

7. The feed horn arrangement as claimed in claim 1 wherein said second frequency lies within Ku-band frequency spectrum.

8. The feed horn arrangement as claimed in claim 1 wherein said solid dielectric waveguide means comprises tetraflouroethylene plastic.

9. Dual frequency reception equipment for mounting at the focus of a satellite antenna comprising:
   a first frequency amplifier;
   a first frequency feed horn for directing said first frequency signals to said first amplifier;
   a second frequency amplifier, said second frequency being higher than said first frequency;
   a second frequency feed horn for directing said second frequency signals to said second frequency amplifier; and
   solid dielectric waveguide means for said second frequency signals, said solid dielectric waveguide means having a first portion disposed within said first frequency feed horn and a second portion extending out of said first frequency feed horn and into said second frequency feed horn to thereby direct said second frequency signal into said second frequency feed horn for delivery to said second frequency amplifier.

10. The reception equipment as claimed in claim 9 wherein said solid dielectric waveguide means is straight and extends out of the rear of said first frequency feed horn.

11. The reception equipment as claimed in claim 9 wherein said first frequency lies within the C-band frequency spectrum.

12. The reception equipment as claimed in claim 9 where said second frequency lies within the Ku-band frequency spectrum.

* * * * *